United States Patent
Lee et al.

(10) Patent No.: US 12,047,248 B2
(45) Date of Patent: Jul. 23, 2024

(54) METHOD OF CONTROLLING STATE CONTROL PARAMETER FOR ADJUSTING STATE OF NETWORK OF BASE STATION BY USING ANY ONE OF PLURALITY OF MODELS AND ELECTRONIC DEVICE PERFORMING THE METHOD

(71) Applicant: SAMSUNG ELECTRONICS CO., LTD., Suwon-si (KR)

(72) Inventors: Taeseop Lee, Suwon-si (KR); Seowoo Jang, Suwon-si (KR); Minsuk Choi, Suwon-si (KR); Taejeoung Kim, Suwon-si (KR); Juhwan Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 17/506,195

(22) Filed: Oct. 20, 2021

(65) Prior Publication Data
US 2022/0131764 A1    Apr. 28, 2022

Related U.S. Application Data

(63) Continuation of application No. PCT/KR2021/011527, filed on Aug. 27, 2021.

(30) Foreign Application Priority Data

Oct. 26, 2020   (KR) .......................... 10-2020-0139750

(51) Int. Cl.
*H04L 41/14* (2022.01)
*H04W 24/02* (2009.01)

(52) U.S. Cl.
CPC ........... *H04L 41/145* (2013.01); *H04W 24/02* (2013.01)

(58) Field of Classification Search
None
See application file for complete search history.

(56) References Cited

U.S. PATENT DOCUMENTS 11,006,293 B1 * 5/2021 Singh .................... H04W 24/04
11,109,283 B1 * 8/2021 Kulkarni ........... H04W 36/0055
(Continued)

FOREIGN PATENT DOCUMENTS

KR    10-2011-0026012    3/2011
KR    10-2012-0111709    10/2012
(Continued)

OTHER PUBLICATIONS

International Search Report and Written Opinion dated Nov. 29, 2021 in corresponding International Application No. PCT/KR2021/011527.

*Primary Examiner* — Anh Vu H Ly
(74) *Attorney, Agent, or Firm* — Nixon & Vanderhye P.C.

(57) ABSTRACT

A method, performed by an electronic device, of controlling a state control parameter for adjusting a state of a network of a base station, using any one of a plurality of models, includes: obtaining information related to the state of the network from the base station, performing simulation on each of the plurality of models based on the obtained information related to the state of the network, selecting any one model from among the plurality of models based on a result of the performed simulation, and transmitting a value of the state control parameter, calculated using the selected any one model, to the base station to update the state control parameter.

17 Claims, 6 Drawing Sheets

(56) References Cited

U.S. PATENT DOCUMENTS

| | | | |
|---|---|---|---|
| 2010/0029941 A1 | 2/2010 | Wallace et al. | |
| 2010/0034151 A1 | 2/2010 | Alexiou et al. | |
| 2012/0253773 A1 | 10/2012 | Cheon et al. | |
| 2013/0122884 A1* | 5/2013 | Saito | H04W 16/18 |
| | | | 455/418 |
| 2013/0122885 A1* | 5/2013 | Kojima | G05B 23/0251 |
| | | | 455/418 |
| 2015/0016289 A1* | 1/2015 | Yun | H04W 24/02 |
| | | | 370/252 |
| 2015/0350923 A1 | 12/2015 | Wang et al. | |
| 2016/0165462 A1 | 6/2016 | Tan | |
| 2017/0070396 A1 | 3/2017 | Flanagan et al. | |
| 2018/0268296 A1 | 9/2018 | Zheng et al. | |
| 2019/0149425 A1 | 5/2019 | Larish et al. | |
| 2020/0053591 A1 | 2/2020 | Prasad | |
| 2022/0225127 A1* | 7/2022 | Imran | H04W 24/02 |

FOREIGN PATENT DOCUMENTS

| | | | | |
|---|---|---|---|---|
| KR | 10-2015-0084010 | | 7/2015 | |
| KR | 10-2018-0069877 | | 6/2018 | |
| WO | 2004/8594 | | 3/2020 | |
| WO | WO-2020048594 A1 * | | 3/2020 | G06N 3/0454 |

* cited by examiner

METHOD OF CONTROLLING STATE CONTROL PARAMETER FOR ADJUSTING STATE OF NETWORK OF BASE STATION BY USING ANY ONE OF PLURALITY OF MODELS AND ELECTRONIC DEVICE PERFORMING THE METHOD

CROSS-REFERENCE TO RELATED APPLICATIONS

This application is a continuation of International Application No. PCT/KR2021/011527 designating the United States, filed on Aug. 27, 2021, in the Korean Intellectual Property Receiving Office and claiming priority to Korean Patent Application No. 10-2020-0139750, filed on Oct. 26, 2020, in the Korean Intellectual Property Office, the disclosures of which are incorporated by reference herein in their entireties.

BACKGROUND

Technical Field

The disclosure relates to a method of controlling a state control parameter for adjusting a state of a network of a base station and an electronic device performing the method.

Background Art

With the development of communication technologies, users may perform tasks in various forms by communicating with a base station using a user equipment (UE). For example, the users may transmit and receive voice messages or text messages, reproduce a sound source or an image, or use the Internet, using their respective UEs.

One base station may include an access network with one or more UEs, and a coverage in which one base station provides a good-quality communication service to a user may be limited, such that a plurality of base stations may have overlapping service coverages. Recently, a self-organizing network (SON) scheme has been applied to the base station of the access network. The SON refers to a network that is self-organized automatically adapting to a surrounding situation, and is used to solve the economic feasibility problems of expansion of communication network coverage and transmission capacity and increase the economic utility of network operation and network management. To implement an SON, a central server may be required which is capable of collecting data from a plurality of base stations to analyze the collected data and deriving an optimized configuration.

DISCLOSURE

Technical Problem

A central server may control a parameter related to a network state to optimize states of access networks. For example, the central server may calculate a value of a parameter for adjusting a network state for each base station and provide the calculated value to each base station, thereby improving the quality of a communication service provided by each base station to UEs.

However, when the value of the parameter calculated by the central server is not an appropriate value, the quality of the communication service provided through each base station may be significantly degraded. In modern society where communication services are popularized, users may react sensitively to degradation of the quality of the communication services, such that the reliability and stabilization of the quality of the communication services may be key factors to the users and mobile communication network operators providing the communication services.

The parameter may be calculated using various models, but in such a communication service where the user is likely to react sensitively to quality degradation, it may be difficult to actively consider and apply various models unless high-level reliability and safety are secured.

Technical Solution

According to an example embodiment of the disclosure, a method, performed by an electronic device, of controlling a state control parameter for adjusting a state of a network of a base station, using any one of a plurality of models, includes: obtaining information related to the state of the network from the base station, performing simulation on each of the plurality of models based on the obtained information related to the state of the network, selecting any one model from among the plurality of models based on a result of the performed simulation, and transmitting a value of the state control parameter calculated using the selected any one model to the base station to update the state control parameter.

According to an example embodiment of the disclosure, an electronic device configured to control a state control parameter for adjusting a state of a network of a base station, using any one of a plurality of models, includes: a communication unit comprising communication circuitry configured to transmit and/or receive data to and from the base station, a memory storing the data and the plurality of models, and at least one processor electrically connected to the communication unit and the memory, wherein the at least one processor is configured to control the electronic device to: obtain information related to the state of the network from the base station, perform simulation on each of the plurality of models based on the obtained information related to the state of the network, select any one model from among the plurality of models based on a result of the performed simulation, and transmit a value of the state control parameter calculated using the selected any one model to the base station to update the state control parameter.

DESCRIPTION OF DRAWINGS

The above and other aspects, features, and advantages of certain embodiments of the present disclosure will be more apparent from the following detailed description, taken in conjunction with the accompanying drawings, in which.

With regard to the description of the drawings, similar reference numerals may be used to refer to similar or related components.

MODE FOR INVENTION

Figure 1:
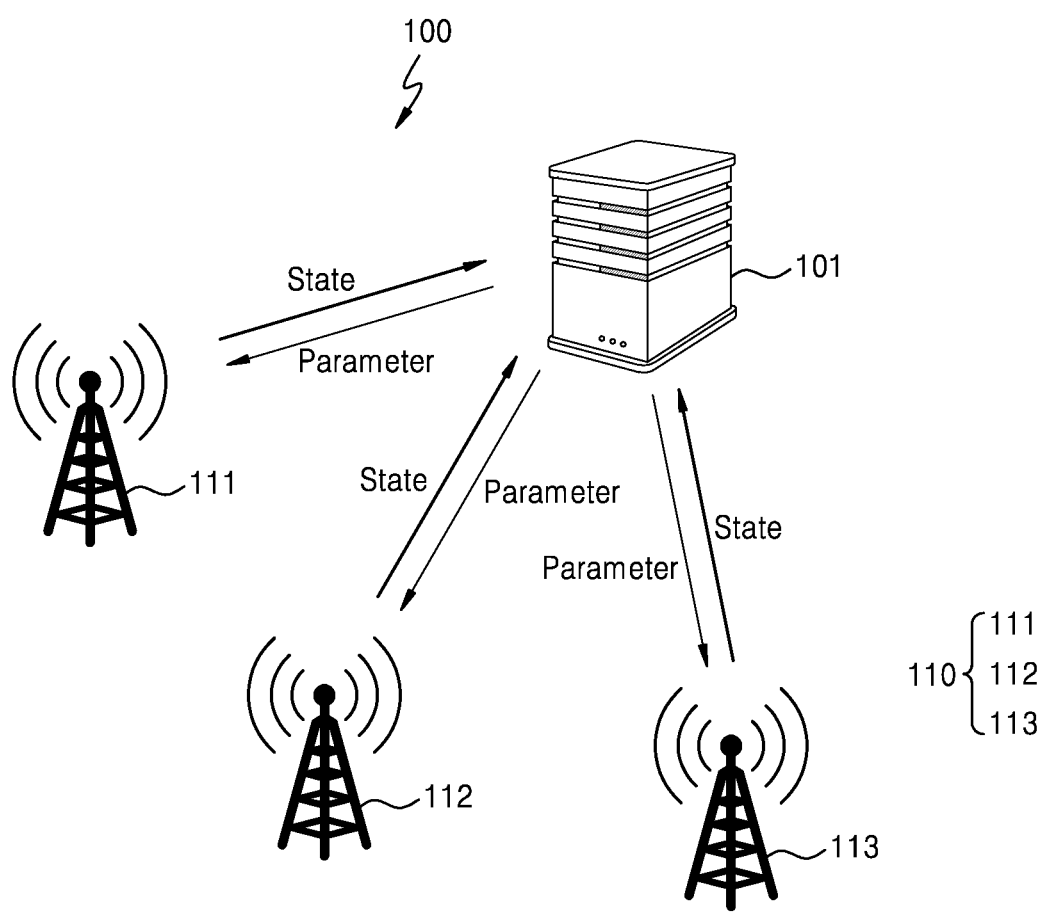
FIG. 1 is a diagram illustrating an example communication system including a base station and a server that adjusts a state of a network of the base station, according to various embodiments.

FIG. 1 is a diagram illustrating an example communication system including a base station and a server that adjusts a state of a network of the base station, according to various embodiments.

Referring to FIG. 1, a communication system 100 may include a server 101 and a plurality of base stations 110, which may include a first base station 111, a second base station 112, and a third base station 113. According to various embodiments of the disclosure, each base station 111, 112, or 113 may include at least one of a central unit (CU), a distributed unit (DU), a digital signal processing unit (DU), or a radio unit (RU). According to various embodiments of the disclosure, the number of base stations connected to the server 101 may not be limited to the illustration of FIG. 1.

According to an embodiment of the disclosure, the server 101 may transmit and receive data to and from each base station 110. For example, the server 101 may receive information related to a state of a network of each base station 110 from each base station. The information related to the state of the network may include, for example, and without limitation, at least one of the number of user equipments (UEs) connected to each cell included in each base station, a physical resource block (PRB) usage of each cell, an Internet protocol (IP) throughput of each cell, or a downlink (DL) data volume of each cell. In another example, the server 101 may transmit a value of a state control parameter to each base station. The state control parameter may be understood as a parameter for adjusting a state of a network of each base station. In an embodiment of the disclosure, state control parameters may affect a state of an access network by affecting, for a plurality of cells included in a base station, the adjustment of a load of a cell or adjustment of on or off of the cell. According to an embodiment of the disclosure, the state control parameters may include, for example, and without limitation, at least one of a reference signal received power (RSRP) threshold value, a reference signal received quality (RSRQ) threshold value, a physical radio block (PRB) rate threshold value, a cell re-selection priority, or the like.

According to an embodiment of the disclosure, the server 101 and each base station 110 may periodically transmit and receive the data based on a specified time interval. According to an embodiment of the disclosure, the server 101 and each base station 110 may transmit and receive the data in response to a request message transmitted from the server 101 or each base station 110 to the other. For example, each base station 110 may detect a need for improvement of a state of a network and provide a request message to the server 101 to obtain a new value of a state control parameter. The server 101 may transmit the new value of a state control parameter to each base station 111, 112, or 113 in response to the request message. In another example, the server 101 may transmit the request message to each base station 110 to obtain information related to a current state of a network for calculating the new value of a state control parameter. Each base station 111, 112, or 113 may transmit the information related to the current state of the network to the server 101 in response to the request message.

According to various embodiments of the disclosure, the server 101 may derive an appropriate value of the state control parameter to allow each base station 110 to adjust the state of the network for various purposes. For example, the first base station 111 may perform state adjustment on a state of a network for load balancing among a plurality of cells included in the first base station 111, and the server 101 may derive the appropriate value of the state control parameter to achieve load balancing among the plurality of cells, based on information related to the state of the network of the first base station 111. In another example, the second base station 112 may perform state adjustment on a state of a network for energy saving, and the server 101 may derive the appropriate value of the state control parameter to save energy, based on information related to the state of the network of the second base station 112.

According to various embodiments of the disclosure, each base station 110 may adjust the state to equalize loads of the plurality of cells included in each base station 111, 112, or 113 or adjust the state to save energy consumed by the plurality of cells. In various embodiments of the disclosure, each base station 110 may change values of state control parameters related to network state adjustment to adjust a state of a network. For example, each base station 111, 112, or 113 may receive a value of a state control parameter derived by the server 101 from the server 101 and adjust a state of a network by changing the value of the state control parameter into the received value.

Figure 2:
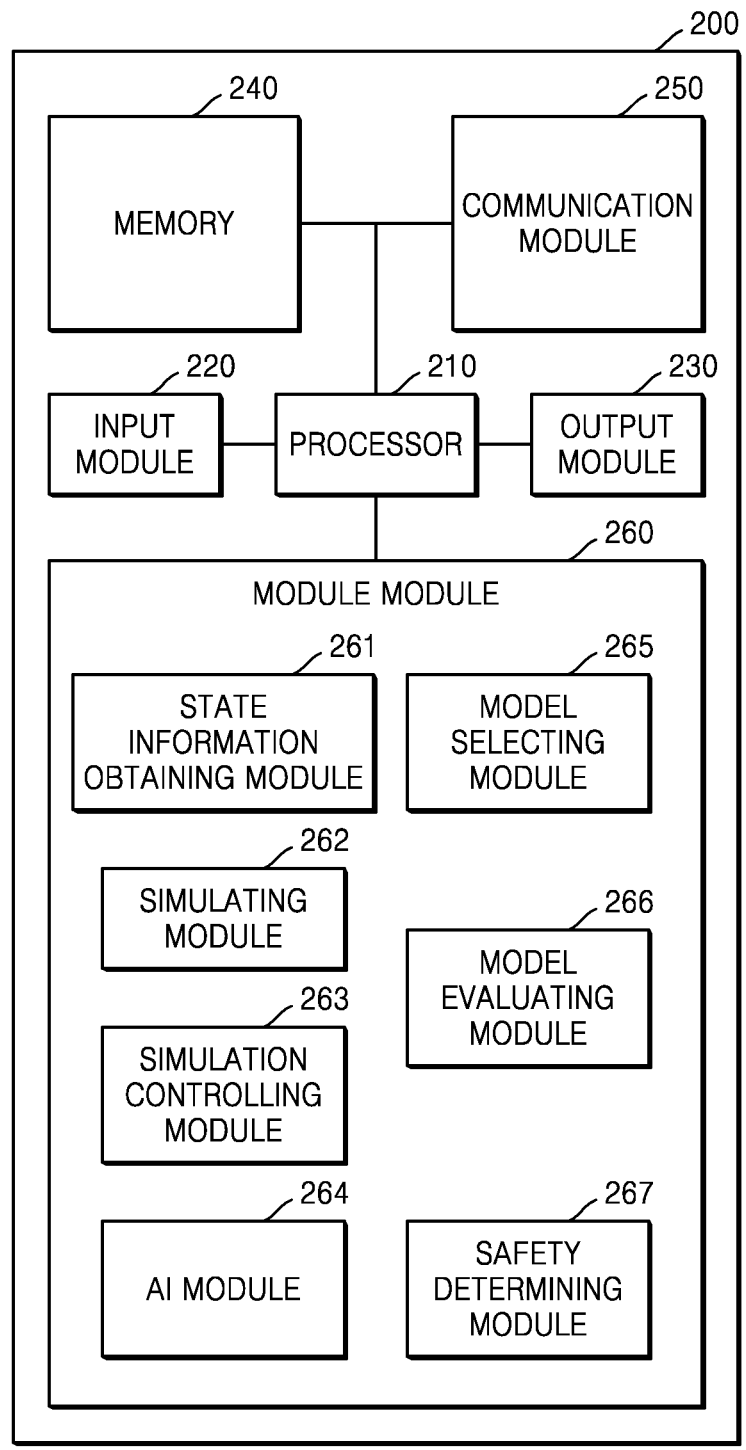
FIG. 2 is a block diagram illustrating an example configuration of an example electronic device that adjusts a state of a network of a base station, according to various embodiments.

FIG. 2 is a block diagram illustrating an example configuration of an example electronic device that adjusts a state of a network of a base station, according to various embodiments.

Referring to FIG. 2, an electronic device 200 may include a processor (e.g., including processing circuitry) 210, an input unit (e.g., including input circuitry) 220, an output unit (e.g., including output circuitry) 230, a memory 240, a communication unit (e.g., including communication circuitry) 250, and a module unit (e.g., including various modules including various circuitry, processing circuitry and/or executable program elements) 260 including a plurality of operable modules. According to various embodiments of the disclosure, a structure of the electronic device 200 is not limited to the illustration of FIG. 2, or may further include a component not shown in FIG. 2 or omit some of the components shown in FIG. 2. For example, a plurality of operable modules are illustrated as being included in the module unit 260 in FIG. 2, but at least some of the plurality of modules may be implemented as software modules stored in the memory 240. For example, a state information obtaining module 261 may be stored as a software module in the memory 240, instead of being implemented as a separate hardware module included in the module unit 260 as shown in FIG. 2, and may operate by being executed by the processor 210. According to an embodiment of the disclosure, the electronic device 200 may be understood as a component that is the same as or similar to the server 101 shown in FIG. 1.

The processor 210 may include various processing circuitry and be electrically connected to components included in the electronic device 200 and perform computation or data processing for control and/or communication of the components included in the electronic device 200. According to an embodiment of the disclosure, the processor 210 may load a command or data received from at least one of other components in the memory 240 and process the command or data, and store resulting data in the memory 240.

The input unit 220 and the output unit 230 may include various circuitry and be electrically connected to the processor 210, and may include interface components for transmitting or receiving data to or from another electronic device outside the electronic device 200, e.g., each base station 111, 112, or 113 shown in FIG. 1. According to an embodiment of the disclosure, the input unit 220 may input thereto information related to a state of a network received from a base station through the communication unit 250, and the output unit 230 may output a value of a state control parameter transmitted to the base station through the communication unit 250.

The memory 240 may be electrically connected to the processor 210 and store a command or data associated with components included in the electronic device 200. According to various embodiments of the disclosure, the memory 240 may store information related to a state of a base station, obtained using the state information obtaining module 261, a value of a state control parameter calculated in a state control parameter value calculating module, instructions for the foregoing operations, etc. According to an embodiment of the disclosure, when at least some modules included in the module unit 260 are implemented with software executed by the processor 210, the memory 240 may store instructions for executing such software modules.

The communication unit 250 may include various communication circuitry and support establishing a wired or wireless communication channel between the electronic device 200 and another external electronic device and performing communication via the established communication channel. According to an embodiment of the disclosure, the communication unit 250 may receive data from the other external electronic device or transmit data to the other external electronic device, through wired communication or wireless communication. According to various embodiments of the disclosure, the communication unit 250 may include a wireless communication module (e.g., a cellular communication module, a short-range wireless communication module, or a global navigation satellite system (GNSS) communication module) or a wired communication module (e.g., a local area network (LAN) communication module or a power-line communication module), and may communicate with the external electronic device using a corresponding communication module, via a short-range communication network (e.g., Bluetooth, wireless-fidelity (Wi-Fi) direct, or infrared data association (IrDA)) or a long-range communication network (e.g., a cellular network, the Internet, or a computer network (e.g., an LAN or wide area network (WAN)).

The module unit 260 may include a plurality of modules for implementing a plurality of operations executed by the electronic device 200. According to various embodiments of the disclosure, the module unit 260 may include a hardware component for implementing at least some of the plurality of modules shown in FIG. 2 and may be understood as a component conceptually including hardware for respectively implementing the modules. According to various embodiments of the disclosure, the structure of the module unit 260 is not limited to the illustration of FIG. 2, and at least some of the plurality of modules included in the module unit 260 shown in FIG. 2 may be stored in the memory 240 by being implemented as software. According to various embodiments of the disclosure, the plurality of modules included in the module unit 260 are not limited to the illustration of FIG. 2, and at least one of the illustrated modules may be omitted from the module unit 260 may omit or other modules (not illustrated) may be further included in the module unit 260.

The state information obtaining module 261 may obtain, from the base station, information related to a state of a network of a base station, by being executed by the processor 210. According to an embodiment of the disclosure, a state of a network may, for example, be understood as a state related to allocation, performed by a base station, of radio resources to UEs connected to the base station. According to various embodiments of the disclosure, the information related to the state of the network may include, for example, and without limitation, at least one of the number of UEs connected to each cell included in each base station, a PRB usage of each cell, an IP throughput of each cell, or a DL data volume of each cell, or the like.

According to an embodiment of the disclosure, the state information obtaining module 261 may obtain data in a non-preprocessed state from a base station and preprocess the data in the non-preprocessed state, thereby obtaining the information related to the state of the network. In an embodiment of the disclosure, the data in the non-preprocessed state may include performance measurement (PM) data. In an embodiment of the disclosure, the pre-processing may include filtering, reshaping, or normalizing the data in the non-preprocessed state.

According to various embodiments of the disclosure, the state information obtaining module 261 may obtain data related to a state of a network from the data in the non-preprocessed state based on a specified purpose. For example, the state information obtaining module 261 may obtain, based on a purpose for adjusting a state of a network of a base station, e.g., load balancing or energy saving, information required for each purpose. In an embodiment of the disclosure, the state information obtaining module 261 may obtain the number of UEs connected to each cell, for load balancing. In an embodiment of the disclosure, the state information obtaining module 261 may obtain a PRB usage of each cell, for energy saving.

According to an embodiment of the disclosure, the state information obtaining module 261 may obtain, from the base station, information about a current value of a state control parameter for adjusting a state of a network of the base station. The current value of the state control parameter may be understood as a value of the state control parameter corresponding to the current state of the network.

According to various embodiments of the disclosure, the state information obtaining module 261 may store the information obtained from the base station or the information obtained from the base station and preprocessed in the memory 240 or transmit the obtained information or the obtained and preprocessed information to at least one other module.

A simulating module 262 may perform simulation on each of a plurality of models in an environmental condition that is the same as or similar to an actual network, by being executed by the processor 210. For example, the simulating module 262 may perform simulation on each of the plurality of models when a model evaluating module 266 performs evaluation on each of the plurality of models. According to an embodiment of the disclosure, the simulating module 262 may be designed by a simulation controlling module 263 as an environment that is the same as or similar to the actual network, and may apply state control parameters respectively calculated using the plurality of models to the designed environment. In an embodiment of the disclosure, the simulating module 262 may predict how the state of the network is to be adjusted for each of the applied state control parameters.

According to an embodiment of the disclosure, the simulating module 262 may be used for an operation of training at least one AI model. For example, the simulating module 262 may provide information related to a state of a virtual network for at least one AI model and obtain information about a state of a state control parameter from the at least one AI model. The simulating module 262 may provide, to the at least one AI model, information related to a state of a virtual network, the state being adjusted by applying the obtained value of the state control parameter to a simulation environment. The simulating module 262 may be used to train at least one AI model by repeating the foregoing process.

The simulation controlling module 263 may design or set up an environment of the simulating module 262, by being executed by the processor 210. For example, the simulation controlling module 263 may calculate a plurality of simulation scenarios, using information related to a state of a network of a base station or information about the current value of a state control parameter, obtained from the state information obtaining module 261. The simulation controlling module 263 may design or set up a simulation environment by selecting a simulation scenario that is most similar to reality after performing simulation for the plurality of simulation scenarios.

In an embodiment of the disclosure, the simulation scenario may, for example, be understood as a set of a plurality of parameters for designing or setting up a simulation environment. For example, the simulation scenario may be a parameter set including, for example, and without limitation, information about at least one of a distance between base stations (e.g., an inter-site distance (ISD), the number of maximum possible UEs per cell included in the base station, a packet size, a request interval, a position of a hotspot, a rate of hotspot UEs, or the like. In an embodiment of the disclosure, some of the plurality of parameters included in the simulation scenario may have a fixed value for each scenario. For example, a distance between base stations and the number of maximum possible UEs per cell included in each base station may have fixed values in each of the plurality of simulation scenarios.

According to an embodiment of the disclosure, selection of a scenario that is most similar to the reality among the plurality of simulation scenarios may be performed by comparing values of the specified parameter. According to an embodiment of the disclosure, the specified parameter may include, for example, and without limitation, at least one of the number of UEs connected to each cell included in a base station, a PRB usage of each cell, an IP throughput of each cell, or the like. In an embodiment of the disclosure, the values of the specified parameter for the respective plurality of cells included in the base station may be expressed as a vector including a specified number of components. For example, when the number of cells included in a base station is four and the number of types of the specified parameter is three, the vector may include twelve components. In an embodiment of the disclosure, a result of the plurality of simulation scenarios may be expressed in the form of a vector, and may be compared with a vector including an actual network value for each component, thus calculating a similarity. The simulation controlling module 263 may design or set up an environment of the simulating module 262, by selecting a simulation scenario having the highest priority calculated from among the plurality of simulation scenarios.

An artificial intelligence (AI) module 264 may train at least one AI model, by being executed by the processor 210. According to various embodiments of the disclosure, at least one AI model may include an AI model using at least one of reinforcement learning, supervised learning, machine learning, continual learning, federated learning, or deep learning.

According to an embodiment of the disclosure, the AI module 264 may train at least one AI model using the simulating module 262. For example, the at least one AI model may include, for example, and without limitation, a reinforcement learning model, and the AI module 264 may cause the at least one AI model to obtain information related to a state of a virtual network as a state parameter from the simulating module 262 and to calculate a value of a virtual state control parameter as an action parameter based on the obtained information. The AI module 264 may transmit the calculated value of the virtual state control parameter to the simulating module 262, and obtain information related to the state of the virtual network adjusted based on the value of the virtual state control parameter, as a reward parameter of at least one AI model from the simulating module 262. The AI module 264 may train at least one AI model, by repeating the process.

According to an embodiment of the disclosure, the AI module 264 may train at least one AI model based on information related to a state of a network of a base station, obtained from the state information obtaining module 261. For example, the AI module 264 may obtain, periodically at specified intervals, information related to a state of a network of a base station obtained by the state information obtaining module 261 periodically at the specified intervals. The AI module 264 may train at least one AI model based on an obtained plurality of pieces of information.

According to an embodiment of the disclosure, the AI module 264 may deploy the trained at least one AI model in a model selecting module 265. In an embodiment of the disclosure, when the at least one AI model is deployed in the model selecting module 265, it may be understood to be identical or similar to a case where the at least one AI model is configured as one of a plurality of models selectable by the model selecting module 265. The AI module 264 may deploy the at least one AI model in the model selecting module 265 when the AI module 264 determines that the amount of data the at least one AI model learns is greater than or equal to a specified level.

The model selecting module 265 may select any one model from among a plurality of models, by being executed by the processor 210. For example, the model selecting module 265 may select any model from among the plurality of models to calculate a state control parameter for adjusting a state of a network of a base station. According to various embodiments of the disclosure, the plurality of models may include at least one AI model or at least one rule-based algorithm model. In an embodiment of the disclosure, the at least one AI model may include an AI model using, for example, and without limitation, at least one of reinforcement learning, supervised learning, machine learning, continual learning, federated learning, deep learning, or the like. In an embodiment of the disclosure, a rule-based algorithm model may be understood as an algorithm model for calculating a result value based on a rule preset by a person, and may be understood to be identical or similar to an algorithm model of an if-then scheme. According to an embodiment of the disclosure, the plurality of models may include a default setting model. The default setting model may set a state control parameter to a default setting value.

According to an embodiment of the disclosure, the module selecting module 265 may request a model evaluating module 266 to evaluate the plurality of models to select any one model from among the plurality of models. For example, the model selecting module 265 may calculate a value of a state control parameter corresponding to each of the plurality of models, based on the information related to the state of the network obtained by the state information obtaining module 261. The model selecting module 265 may transmit calculated values of the state control parameter to the model evaluating module 266 and request the model evaluating module 266 to evaluate the plurality of models.

According to an embodiment of the disclosure, the model selecting module 265 may obtain simulation results with respect to the plurality of models from the model evaluating module 266 and evaluate the plurality of models based on the simulation results, thereby selecting a model having the best simulation result. According to an embodiment of the disclosure, evaluation of the plurality of models may be performed based on a key performance indicator (KPI) of a mobile communication network operator. In various embodiments of the disclosure, evaluation of the plurality of models may be performed based on, for example, at least one of the lowest IP throughput among a plurality of cells of a base station, a standard deviation among IP throughputs of the plurality of cells, or the number of cells having IP throughputs lower than a specified threshold value.

According to an embodiment of the disclosure, the model selecting module 265 may select any model from among the plurality of models based on priorities of the plurality of models. For example, when the model selecting module 265 is not capable of selecting any one model based on a performance evaluation result obtained from the model evaluating module 266, for example, when any one model having a good performance evaluation result among the plurality of models is not determined, the model selecting module 265 may select any one model based on preset priorities.

According to an embodiment of the disclosure, when the model selecting module 265 selects any model, the model selecting module 265 may store the value of the state control parameter calculated using the selected model in the memory 240. According to an embodiment of the disclosure, the value of the state control parameter stored in the memory 240 may be transmitted to the base station through the communication unit 250 to adjust the state of the network of the base station. According to an embodiment of the disclosure, a safety determining module 267 may determine safety on the value of the state control parameter stored in the memory 240 before the value is transmitted to the base station.

The model evaluating module 266 may evaluate the plurality of models included in the model selecting module 265, by being executed by the processor 210. For example, the model evaluating module 266 may request the simulating module 262 to simulate the values of the state control parameter, respectively calculated from the plurality of models, and evaluate the plurality of models by obtaining simulation results. In an embodiment of the disclosure, the model evaluating module 266 may be omitted or may be implemented as a part of the model selecting module 265. For example, the model selecting module 265 may directly request the simulating module 262 to simulate the values of the state control parameter, respectively calculated from the plurality of models, and directly obtain simulation results.

The safety determining module 267 may determine safety of the value of the state control parameter calculated using any model selected by the model selecting module 265, by being executed by the processor 210. According to an embodiment of the disclosure, the safety determining module 267 may determine safety of the value of the state control parameter calculated based on history information previously stored in the memory 240. For example, by examining the history information, the safety determining module 267 may determine whether the calculated value of the state control parameter may have a negative influence upon the state of the network when the calculated value is applied to the real network.

In various embodiments of the disclosure, the history information may include, for example, and without limitation, information about past history of the state of the network and the applied value of the state control parameter. For example, when a specific value of a state control parameter is applied to a past specific state of a network, the history information may include history of an adjustment result of a state of the network and performance evaluation with respect to the adjusted state of the network. In an embodiment of the disclosure, the history information may be stored in the memory 240 and may be updated each time when information about the state of the network and the state control parameter is obtained by the state information obtaining module 261. The history information, which is based on the state of the real network, may be distinguished from a simulation result obtained by the simulating module 262.

According to an embodiment of the disclosure, the safety determining module 267 may examine, using the history information, history in which the same or similar value of the state control parameter is applied to the past same or similar state of the network, and examine whether the past adjusted state of the network is improved or degraded, thereby determining safety of the calculated value of the state control parameter. In an embodiment of the disclosure, when the safety determining module 267 determines based on a KPI of a mobile communication network operator whether the past adjusted value of the network is not degraded, the safety determining module 267 may determine that the calculated value of the state control parameter is safe. In an embodiment of the disclosure, when the safety determining module 267 determines based on the KPI of the mobile communication network operator whether the past adjusted value of the network is degraded, the safety determining module 267 may determine that the calculated value of the state control parameter is not safe.

According to an embodiment of the disclosure, when the safety determining module 267 determines that the calculated value of the state control parameter is safe from the selected model, the safety determining module 267 may finally determine that the calculated value of the state control parameter may be transmitted to the base station. For example, the safety determining module 267 may generate a signal indicating that the state control parameter selected from the model selecting module 265 and stored in the memory 240 may be transmitted to the base station through the communication unit 250 or change a value of a related parameter.

According to an embodiment of the disclosure, when the safety determining module 267 determines that the value of the state control parameter calculated from the selected model is not safe, the safety determining module 267 may not transmit the value of the state control parameter to the base station. According to an embodiment of the disclosure, when the safety determining module 267 determines that the value of the state control parameter calculated from the selected model is not safe, the safety determining module 267 may request the model selecting module 265 to select another model. For example, the safety determining module 267 may request selection of a model determined to relatively secure safety, e.g., a rule-based algorithm model or a default setting model. In this case, the model selecting module 265 may transmit the calculated value of the state control parameter to the safety determining module 267 using the rule-based algorithm model or the default setting model.

Figure 3:
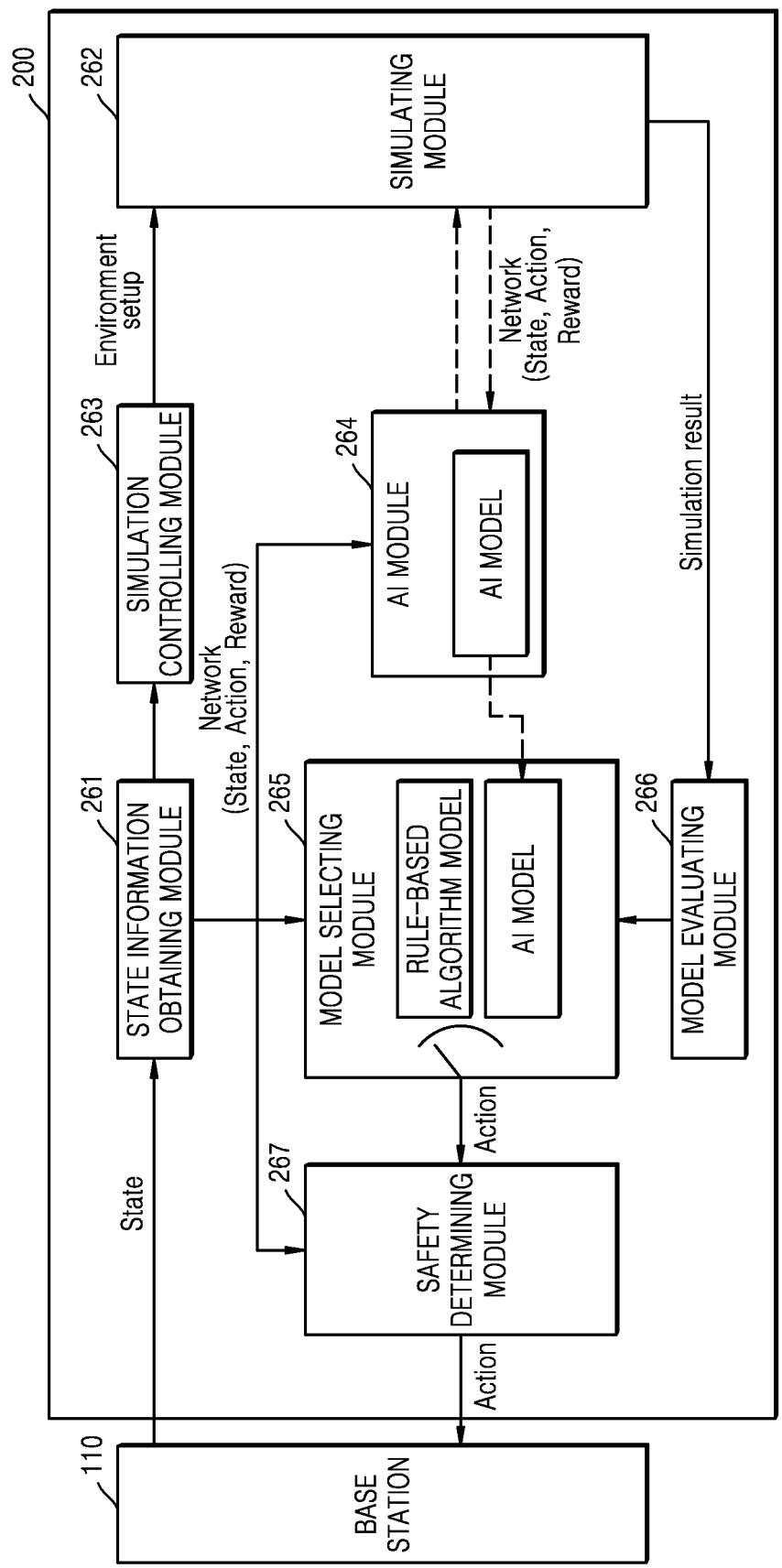
FIG. 3 is a diagram illustrating example data flow between modules of an electronic device to adjust a state of a network of a base station, according to various embodiments.

FIG. 3 is a diagram illustrating example data flow between modules of an electronic device to adjust a state of a network of a base station, according to various embodiments.

Referring to FIG. 3, the base station 110 and the electronic device 200 (e.g., the server 101 of FIG. 1) may transmit and/or receive information related to a network of the base station 110. For example, the base station 110 may transmit information related to a state of the network of the base station 110 to the electronic device 200, and the electronic device 200 may transmit a value of a state control parameter for adjusting the state of the network of the base station 110 to the base station 110.

In an embodiment of the disclosure, the information related to the state of the network may correspond to a state parameter of an AI model, and the value of the state control parameter may correspond to an action parameter of the AI model. According to an embodiment of the disclosure, the state information obtaining module 261 may obtain information about a current value of the state control parameter as well as the information related to the state of the network of the base station 110. In various embodiments of the disclosure, the information related to the state of the network may correspond to a reward parameter of the AI model. For example, when information related to a state of a network obtained at a first point in time is a state parameter of the AI model and a current value of a state control parameter obtained at the first point is an action parameter of the AI model, information related to the state of the network obtained at a second point after the first point may correspond to a reward parameter corresponding to the state parameter and the action parameter. In various embodiments of the disclosure, values of the state parameter, the action parameter, and the reward parameter having a mutual corresponding relationship may form a set and may be delivered between modules in the unit of the formed set.

According to various embodiments of the disclosure, information obtained by the state information obtaining module 261, e.g., the values of the state parameter, the action parameter, and the reward parameter, may be stored in the memory 240, and the information stored in the memory 240 may be transmitted to other modules, e.g., the simulation controlling module 263, the AI module 264, the model selecting module 265, and/or the safety determining module 267. In an embodiment of the disclosure, the information transmitted to the simulation controlling module 263 may be used to calculate a simulation scenario for setting up a simulation environment of the simulating module 262. In an embodiment of the disclosure, the information transmitted to the AI module 264 may be input, for example, to train the AI model. In an embodiment of the disclosure, the information transmitted to the model selecting module 265 may be used to calculate the state control parameter using, for example, the plurality of models. In an embodiment of the disclosure, the information transmitted to the safety determining module 267 may be used to examine the same or similar application history from history information together with the calculated state control parameter.

According to an embodiment of the disclosure, a plurality of parameters included in any one of a plurality of simulation scenarios calculated by the simulation controlling module 263 may be input to the simulating module 262 for setting up an environment of the simulating module 262. In various embodiments of the disclosure, the plurality of parameters may include at least one of a distance between the base stations 110 (e.g., an ISD, the number of maximum possible UEs per cell included in the base station 110, a packet size, a request interval, a position of a hotspot, or a rate of hotspot UEs.

According to an embodiment of the disclosure, the simulating module 262 and the AI module 264 may exchange with each other, information related to the network, e.g., at least some of values of the state parameter, the action parameter, and the reward parameter for training the AI model. For example, the simulating module 262 may transmit the value of the state parameter to the AI module 264 which may deliver the action parameter corresponding to the state parameter to the simulating module 262. The simulating module 262 may transmit the reward parameter corresponding to the action parameter to the AI module 264 by performing simulation on the action parameter. The simulating module 262 and the AI module 264 may repeat the process, and in this way, the AI module 264 may train the AI model.

According to an embodiment of the disclosure, when the AI module 264 determines that training of the AI model is performed at a specified level or higher, the AI module 264 may perform model deployment of the AI model for the model selecting module 265. When the AI model is deployed in the model selecting module 265, it may be understood to be identical or similar to a case where the AI model is configured as one of a plurality of models selectable by the model selecting module 265. According to an embodiment of the disclosure, the AI module 264 may train one or more AI models and deploy the one or more AI models in the model selecting module 265.

According to an embodiment of the disclosure, the AI module 264 may perform additional update on any one AI model. For example, the AI module 264 may continue training the AI model using the simulating module 262 or the information obtained from the state information obtaining module 261, even after the AI model is deployed in the model selecting module 265. In an embodiment of the disclosure, when the AI module 264 determines that additional training is performed at the specified level or higher after the AI model is deployed in the model selecting module 265, the AI module 264 may update the AI model deployed in the model selecting module 265. In an embodiment of the disclosure, when the AI module 264 determines that additional training is performed for a specified time or longer after the AI model is deployed in the model selecting module 265, the AI module 264 may update the AI model deployed in the model selecting module 265. In an embodiment of the disclosure, the AI module 264 may update the AI model deployed in the model selecting module 265 periodically based on a specified time interval.

According to an embodiment of the disclosure, the model evaluating module 266 may obtain simulation results with respect to the plurality of models from the simulating module 262 and transmit the obtained simulation results to the model selecting module 265. For example, the model evaluating module 266 may be requested to evaluate the plurality of models from the model selecting module 265, obtain a simulation result for a state control parameter calculated from each of the plurality of models from the simulating module 262, and transmit the simulation result to the model selecting module 265.

According to an embodiment of the disclosure, the model selecting module 265 may transmit the value of the state control parameter calculated using any one selected from among the plurality of models, i.e., a value of an action parameter, to the safety determining module 267. The safety determining module 267 may perform safety evaluation on the value of the action parameter and may transmit the value of the action parameter, e.g., the calculated value of the state control parameter to the base station 110 when the safety determining module 267 determines that the value of the action parameter is safe. In various embodiments of the disclosure, the value of the state control parameter transmitted to the base station 110 may be used to update the state control parameter of the base station 110 to adjust the state of the network of the base station 110.

Figure 4:
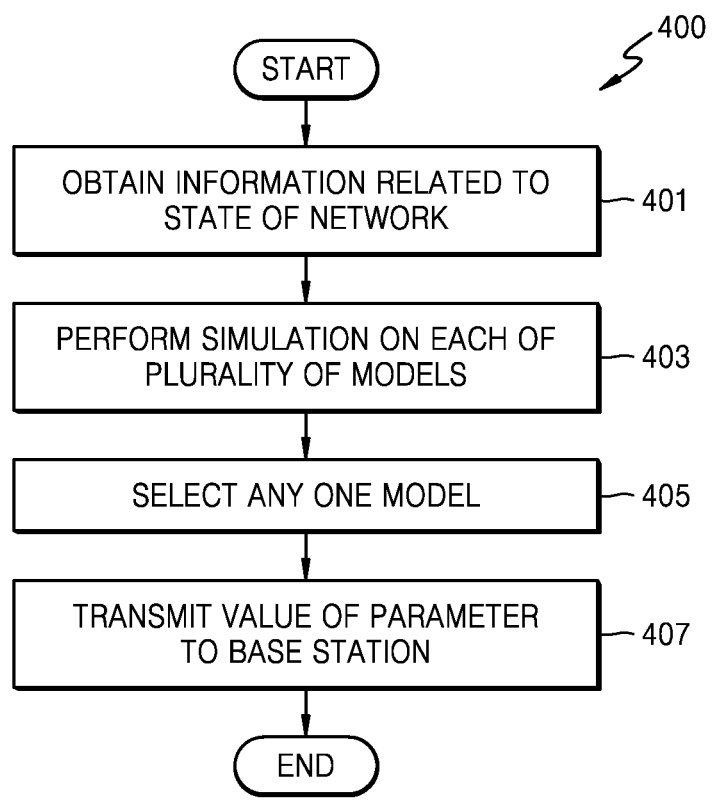
FIG. 4 is a flowchart illustrating an example method, performed by an electronic device, of controlling a state control parameter for adjusting a state of a network of a base station using any one of a plurality of models, according to various embodiments.

FIG. 4 is a flowchart illustrating an example method, performed by an electronic device, of controlling a state control parameter for adjusting a state of a network of a base station using any one of a plurality of models, according to various embodiments.

Referring to FIG. 4, a method 400, performed by an electronic device (e.g., the electronic device 200 of FIG. 2) of controlling a state control parameter to adjust a state of a network of a base station using any one of a plurality of models may include operations 401, 403, 405 and 407 (which may be referred to hereinafter as operations 401 through 407). According to various embodiments of the disclosure, operations 401 through 407 may be performed by the processor 210 shown in FIG. 2. In various embodiments of the disclosure, the method 400, performed by the electronic device, of controlling the state control parameter may omit any one of the operations shown in FIG. 4 without being limited to FIG. 4, and may further include an operation not shown in FIG. 4.

In operation 401, the electronic device may obtain information related to a state of a network from the base station. In an embodiment of the disclosure, the electronic device may obtain information related to a current value of a state control parameter from the base station. The electronic device may obtain non-preprocessed information from the base station and perform preprocessing on the obtained information, thereby obtaining the information related to the state of the network. In an embodiment of the disclosure, the obtained information may be stored in the memory.

In operation 403, the electronic device may perform simulation on each of the plurality of models based on the obtained information. For example, the electronic device may perform simulation on values of the state control parameter calculated based on the obtained information respectively using the plurality of models. According to various embodiments of the disclosure, the plurality of models may include at least one AI model or may further include a rule-based algorithm model or a default setting model.

In operation 405, the electronic device may select any one model from among the plurality of models based on a result of the performed simulation. For example, the electronic device may evaluate a simulation result regarding each of the plurality of models based on a KPI of a mobile communication network operator and select any one model having the best simulation result. In an embodiment of the disclosure, the KPI of the mobile communication operator may include at least one of the lowest IP throughput among a plurality of cells of a base station, a standard deviation among IP throughputs of the plurality of cells, or the number of cells having IP throughputs lower than a specified threshold value.

In operation 407, the electronic device may transmit the value of the state control parameter calculated using any one model selected in operation 405 to update the state control parameter. In an embodiment of the disclosure, the electronic device may perform safety evaluation before transmission of the state control parameter. When the electronic device determines that the value of the state control parameter is safe, the electronic device may transmit the value of the state control parameter to the base station.

Figure 5:
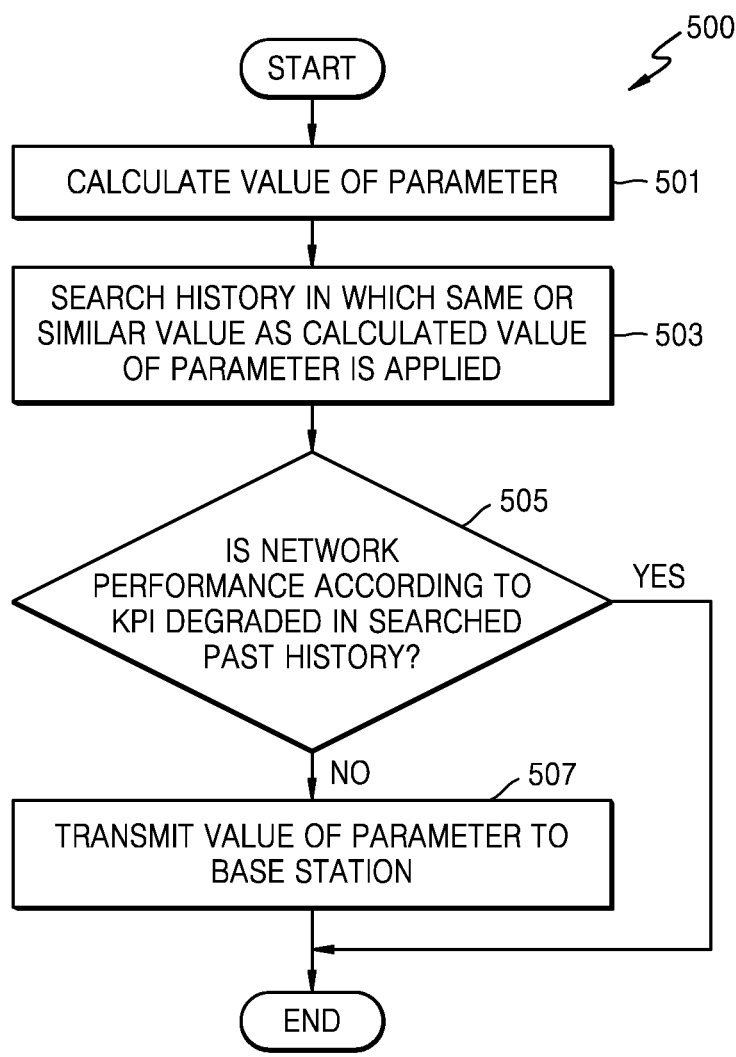
FIG. 5 is a flowchart illustrating an example method, performed by an electronic device, of inspecting safety of a state control parameter for adjusting a state of a network of a base station, according to various embodiments.

FIG. 5 is a flowchart illustrating an example method, performed by an electronic device, of inspecting safety of a state control parameter for adjusting a state of a network of a base station, according to various embodiments.

Referring to FIG. 5, a method 500, performed by an electronic device (e.g., the electronic device 200 of FIG. 2) of inspecting safety of a state control parameter to adjust a state of a network of a base station may include operations 501, 503, 505 and 507 (which may be referred to hereinafter as operations 501 through 507). According to various embodiments of the disclosure, operations 501 through 507 may be performed by the processor 210 shown in FIG. 2. In various embodiments of the disclosure, the method 500, performed by the electronic device, of inspecting the safety of the state control parameter may omit any one of the operations shown in FIG. 5 without being limited to FIG. 5, and may further include an operation not shown in FIG. 5.

In operation 501, the electronic device may calculate a value of a state control parameter. For example, the electronic device may calculate the value of the state control parameter using any one of a plurality of models. In an embodiment of the disclosure, an operation of calculating the value of the state control parameter may be understood as being included in an operation of selecting any one model from among the plurality of models or as including the operation of selecting any one model. For example, operation 501 may be understood as being included in operation 405 shown in FIG. 4.

In operation 503, the electronic device may search history in which the same or similar value to the value of the state control parameter calculated in operation 501 is applied. For example, the electronic device may search history in which the same or similar value to the calculated value of the state control parameter is applied to the same or similar current state of the network, using history information previously stored in the memory, e.g., the past state of the network and history information about a state control parameter applied to the past state.

In operation 505, the electronic device may determine whether the performance of the network based on the KPI of the mobile communication network operator is degraded, in the past history in same or similar range to the calculated value of the state control parameter and the current state of the network. In an embodiment of the disclosure, the KPI of the mobile communication operator may include at least one of the lowest IP throughput among a plurality of cells of a base station, a standard deviation among IP throughputs of the plurality of cells, or the number of cells having IP throughputs lower than a specified threshold value.

In an embodiment of the disclosure, when the electronic device determines in the searched past history that the performance of the network is not degraded ("No" in operation 505), the electronic device may determine that the calculated value of the state control parameter is safe and perform operation 507. In an embodiment of the disclosure, when the electronic device determines in the searched past history that the performance of the network is degraded ("Yes" in operation 505), the electronic device may determine that the calculated value of the state control parameter is not safe and terminate the operation without transmitting the calculated value of the state control parameter to the base station.

In operation 507, the electronic device determines that the calculated value of the state control parameter is safe, such that the electronic device may transmit the calculated value of the state control parameter to the base station to update the state control parameter of the base station.

Figure 6:
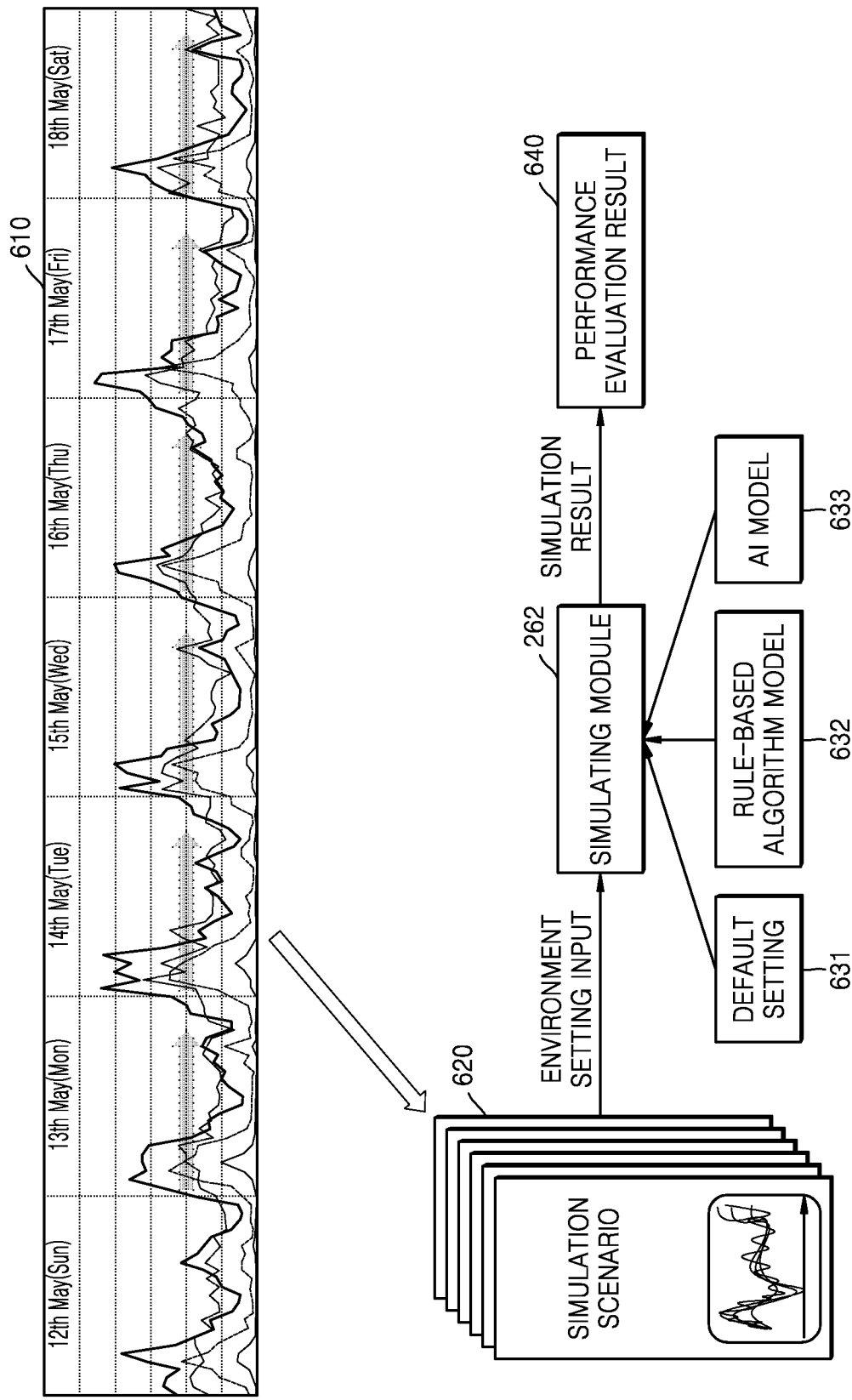
FIG. 6 is a diagram illustrating an example method, performed by an electronic device, of simulating performance evaluation for a plurality of models, according to various embodiments.

FIG. 6 is a diagram illustrating an example method, performed by an electronic device, of simulating performance evaluation for a plurality of models, according to various embodiments.

Referring to FIG. 6, the electronic device (e.g., the electronic device 200 of FIG. 2) may obtain data 610 related to a situation of the network from the base station and calculate a plurality of simulation scenarios 620 from the data 610. According to an embodiment of the disclosure, the data 610 obtained by the electronic device may include data related to a state of the network for a specified time, e.g., seven days. The electronic device may divide the obtained data 610 by specified time intervals. For example, the electronic device may divide the obtained data 610 daily or hourly. According to an embodiment of the disclosure, the electronic device may calculate the plurality of simulation scenarios 620 using the divided data.

In an embodiment of the disclosure, the simulation scenario 620 may, for example, be understood as a set of a plurality of parameters for designing or setting up an environment of the simulating module 262. For example, the simulation scenario 620 may be a parameter set including, for example, and without limitation, information about at least one of a distance between base stations (e.g., an ISD, the number of maximum possible UEs per cell included in the base station, a packet size, a request interval, a position of a hotspot, a rate of hotspot UEs, or the like. In an embodiment of the disclosure, some of a plurality of parameters included in the simulation scenario 620 may have a fixed value for each scenario. For example, a distance between base stations and the number of maximum possible UEs per cell included in the base station may have fixed values in each of the plurality of simulation scenarios 620. According to an embodiment of the disclosure, the electronic device may select a simulation scenario that is most similar to reality from among the plurality of simulation scenarios 620 and design or set up the environment of the simulating module 262 based on the selected simulation scenario.

According to an embodiment of the disclosure, the electronic device may simulate performance evaluation on a plurality of models using the simulating module 262 having the designed or set environment. For example, the electronic device may simulate performance evaluation on the plurality of models by applying a state control parameter calculated using each of the plurality of models to the simulating module 262. According to an embodiment of the disclosure, the plurality of models may include a default setting model 631, a rule-based algorithm model 632, and an AI model 633. In various embodiments of the disclosure, the types or number of plural models may not be limited to the illustration of FIG. 6.

According to an embodiment of the disclosure, the electronic device may obtain a performance evaluation result 640 using a simulation result with respect to each model. In an embodiment of the disclosure, performance evaluation may be performed based on a KPI of a mobile communication network operator. For example, performance evaluation may be performed based on, for example, at least one of the lowest IP throughput among a plurality of cells of the base station, a standard deviation among IP throughputs of the plurality of cells, or the number of cells having IP throughputs lower than a specified threshold value.

In an embodiment of the disclosure, the electronic device may determine that a simulation result with respect to any one of the plurality of models determined to have the highest representative IP throughput is the best result. For each simulation result, the representative IP throughput may be set to the lowest value among the IP throughputs for each of a plurality of cells. In an embodiment of the disclosure, the electronic device may determine that a simulation result with respect to any one of the plurality of models determined to have the lowest standard deviation among IP throughputs of the plurality of cells is the best result. In an embodiment of the disclosure, the electronic device may determine that a simulation result with respect to any one of the plurality of models determined to have a lowest number of cells having IP throughputs lower than a specified threshold value is the best result.

According to an example embodiment of the disclosure, a method, performed by an electronic device, of controlling a state control parameter for adjusting a state of a network of a base station, using any one of a plurality of models, may include: obtaining information related to the state of the network from the base station, performing simulation on each of the plurality of models based on the obtained information related to the state of the network, selecting any one model from among the plurality of models based on a result of the performed simulation, and transmitting a value of the state control parameter calculated using the selected any one model to the base station to update the state control parameter.

According to an example embodiment of the disclosure, the method may further include: determining safety of the calculated value of the state control parameter based on history information previously stored in a memory, wherein, based on a result of determining that the calculated value of the state control parameter is safe, the calculated value of the state control parameter is transmitted to the base station to update the state control parameter.

According to an example embodiment of the disclosure, the determining of the safety may include: determining whether a value that is the same as the calculated value of the state control parameter was previously applied based on the history information, and if performance of the network according to a key performance indicator (KPI) of a mobile communication network operator were not degraded when the value being equal to the calculated value of the state control parameter was previously applied, the calculated value of the state control parameter is determined to be safe.

According to an example embodiment of the disclosure, the plurality of models may include at least one artificial intelligence (AI) model, and the at least one AI model may be trained based on the information related to the state of the network.

According to an example embodiment of the disclosure, the plurality of models may include at least one rule-based algorithm model.

According to an example embodiment of the disclosure, the information related to the state of the network may include at least one of the number of UEs connected to each cell included in each base station, a PRB usage of each cell, an IP throughput of each cell, or a DL data volume of each cell.

According to an example embodiment of the disclosure, the method may further include: obtaining information about a current value of the state control parameter from the base station and storing the information related to the state of the network and the information about the current value of the state control parameter in the memory.

According to an example embodiment of the disclosure, the information related to the state of the network and the information about the current value of the state control parameter, which are stored in the memory, may be input to a simulating module, configured to perform the simulation, to set up an environment of the simulating module.

According to an example embodiment of the disclosure, the plurality of models may include at least one AI model, and the at least one AI model may be trained using the simulating module.

According to an example embodiment of the disclosure, the at least one AI model may include a reinforcement learning model, and the at least one AI model may obtain, as a state parameter, information related to a state of a virtual network from the simulating module, calculate, as an action parameter, a value of a virtual state control parameter based on the obtained information, and obtain, as a reward parameter, the information related to the state of the virtual network adjusted based on the calculated value of the virtual state control parameter, from the simulating module.

According to an embodiment of the disclosure, an electronic device configured to control a state control parameter for adjusting a state of a network of a base station, using any one of a plurality of models, may include: a communication unit comprising communication circuitry configured to transmit and/or receive data to and from the base station, a memory storing the data and the plurality of models, and at least one processor electrically connected to the communication unit and the memory, wherein the at least one processor is configured to control the electronic device to: obtain information related to the state of the network from the base station, perform simulation on each of the plurality of models based on the obtained information related to the state of the network, select any one model from among the plurality of models based on a result of the performed simulation, and transmit a value of the state control parameter, calculated using the selected any one model, to the base station to update the state control parameter.

According to an example embodiment of the disclosure, the at least one processor may be further configured to: determine safety of the calculated value of the state control parameter, based on history information previously stored in a memory, wherein based on a result of determining that the calculated value of the state control parameter is safe, the calculated value of the state control parameter is transmitted to the base station to update the state control parameter.

According to an example embodiment of the disclosure, the at least one processor may be further configured to: determine whether a value that is the same as the calculated value of the state control parameter was previously applied, based on the history information and determine the calculated value of the state control parameter to be safe, if performance of the network according to a key performance indicator (KPI) of a mobile communication network operator were not degraded when the value being equal to the calculated value of the state control parameter was previously applied.

According to an example embodiment of the disclosure, the plurality of models may include at least one AI model, and the at least one AI model may be trained based on the information related to the state of the network.

According to an example embodiment of the disclosure, the plurality of models may include at least one rule-based algorithm model.

According to an example embodiment of the disclosure, the information related to the state of the network may include at least one of the number of UEs connected to each cell included in each base station, a PRB usage of each cell, an IP throughput of each cell, or a DL data volume of each cell.

According to an example embodiment of the disclosure, the at least one processor may be further configured to: obtain information about a current value of the state control parameter from the base station and store the information related to the state of the network and the information about the current value of the state control parameter in the memory.

According to an example embodiment of the disclosure, the information related to the state of the network and the information about the current value of the state control parameter, which are stored in the memory, may be input to a simulating module, configured to perform the simulation, to set up an environment of the simulating module.

According to an example embodiment of the disclosure, the plurality of models may include at least one AI model, and the at least one AI model may be trained using the simulating module.

According to an embodiment of the disclosure, the at least one AI model may include a reinforcement learning model, and the at least one AI model may obtain, as a state parameter, information related to a state of a virtual network from the simulating module, calculate, as an action parameter, a value of a virtual state control parameter, based on the obtained information, and obtain, as a reward parameter, the information related to the state of the virtual network adjusted based on the calculated value of the virtual state control parameter, from the simulating module.

It should be appreciated that various embodiments of the disclosure and the terms used therein are not intended to limit the technological features set forth herein to particular embodiments of the disclosure and include various changes, equivalents, or replacements for a corresponding embodiment of the disclosure. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may refer to various components regardless of order and/or importance and do not limit corresponding components.

When it is described that a component (such as a first component) is "operatively or communicatively coupled with/to" or "connected" to another component (such as a second component), the component can be directly connected to the other component or can be connected to the other component through another component (e.g., a third component).

A term "module" used herein may refer, for example, to a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments of the disclosure as set forth herein may be implemented as software including one or more instructions that are stored in a storage medium (e.g., internal memory or external memory) that is readable by a machine (e.g., a computer). The machine may invoke stored instructions from the storage medium and operate according to the invoked instructions, and may include an electronic device according to the disclosed embodiments of the disclosure. When the instructions are executed by a processor, functions corresponding to the instructions may be performed directly by the processor, or by other components under control of the processor. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of a manufacturer's server, a server of the application store, or a relay server.

Each component (e.g., a module or a program) according to various embodiments of the disclosure may include a single entity or multiple entities, and some of the above-described sub components may be omitted, or other sub components may be further included in various embodiments of the disclosure. Alternatively or additionally, some components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments of the disclosure may be carried out sequentially, in parallel, repeatedly, or heuristically, or one or more of the operations may be executed in a different order or omitted, or one or more other operations may be added.

A function related to artificial intelligence (AI) according to the disclosure is performed through a processor and a memory. The processor may include one processor or a plurality of processors. In this case, one processor or a plurality of processors may include a general-purpose processor such as a CPU, an application processor (AP), a digital signal processor (DSP), etc., a graphic-dedicated processor such as a GPU, a vision processing unit (VPU), etc., and an AI-dedicated processor such as a neural processing Unit (NPU). One processor or a plurality of processors may control data to be processed according to a predefined operation rule or AI model stored in the memory. When one processor or a plurality of processors include an AI-dedicated processor, the AI-dedicated processor may be designed as a hardware structure specialized for processing a specific AI model.

The predefined operation rule or AI model may be made through training. Herein, when the AI model is made through training, it may refer, for example, to a basic AI model being trained based on a learning algorithm using multiple training data, such that the predefined operation rule or AI model set to execute desired characteristics (or purpose) is made. Such training may be performed by a device on which AI according to the disclosure is implemented, or by a separate server and/or system. Examples of a learning algorithm may include, but are not limited to, supervised learning, unsupervised learning, semi-supervised learning, or reinforcement learning.

The AI model may include a plurality of neural network layers. Each of the plurality of neural network layers may have a plurality of weight values, and perform a neural network operation through an operation between an operation result of a previous layer and the plurality of weight values. The plurality of weight values of the plurality of neural network layers may be optimized by a training result of the AI model. For example, the plurality of weight values may be updated to reduce or minimize a loss value or a cost value obtained in the AI model during a training process. Examples of the AI neural network may include, but are not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), and a deep Q-network.

In a method, performed by an electronic device, of controlling a state control parameter for adjusting a state of a network of a base station using any one of a plurality of models according to the disclosure, in a way to deduce or predict a value of the state control parameter, an AI model may be used to optimize the value of the state control parameter using information related to the state of the network of the base station. The processor may convert the data into a form that is appropriate for use as an input to the AI model, by performing preprocessing on the data. The AI model may be made through training. Herein, when the AI model is made through training, it may refer, for example, to a basic AI model being trained based on a learning algorithm using multiple training data, such that the predefined operation rule or AI model set to execute desired characteristics (or purpose) is made. The AI model may include a plurality of neural network layers. Each of the plurality of neural network layers may have a plurality of weight values, and perform a neural network operation through an operation between an operation result of a previous layer and the plurality of weight values.

Reasoning/prediction may refer to technology for determining information and executing logical reasoning and prediction and include knowledge/probability-based reasoning, optimization prediction, preference-based planning, recommendation, etc.

According to embodiments of the disclosure, high-level reliability and safety of the plurality of models calculating the parameter for adjusting the state of the network may be secured. Moreover, in this way, the quality of the communication service may be guaranteed, and the user may be provided with a reliable communication service. Moreover, various effects recognized directly or indirectly from the disclosure may be provided.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

The invention claimed is:

1. A method, performed by an electronic device, of controlling a state control parameter for adjusting a state of a network of a base station, using any one of a plurality of models, the method comprising:
   obtaining information related to the state of the network from the base station;
   performing simulation on each of the plurality of models based on the obtained information related to the state of the network;
   selecting any one model from among the plurality of models based on a result of the performed simulation;
   calculating a value of the state control parameter using the selected any one model;
   determining safety of the calculated value of the state control parameter based on history information previously stored in a memory, wherein the calculated value of the state control parameter is determined to be safe if, based on the history information, performance of the network according to a key performance indicator (KPI) of a mobile communication network operator were not degraded when a value being equal to the calculated value of the state control parameter was previously applied; and
   based on a result of determining that the calculated value of the state control parameter is safe, transmitting the value of the state control parameter to the base station to update the state control parameter.

2. The method of claim 1, wherein the determining of the safety comprises: determining whether the value that is the same as the calculated value of the state control parameter was previously applied based on the history information.

3. The method of claim 1, wherein the plurality of models comprise at least one artificial intelligence (AI) model, and
   the at least one AI model is trained based on the information related to the state of the network.

4. The method of claim 1, wherein the plurality of models comprise at least one rule-based algorithm model.

5. The method of claim 1, wherein the information related to the state of the network comprises at least one of a number of user equipments (UEs) connected to each cell included in the base station, a physical resource block (PRB) usage of each cell, an Internet protocol (IP) throughput of each cell, or a downlink (DL) data volume of each cell.

6. The method of claim 1, further comprising:
   obtaining information about a current value of the state control parameter from the base station; and
   storing the information related to the state of the network and the information about the current value of the state control parameter in the memory.

7. The method of claim 6, wherein the information related to the state of the network and the information about the current value of the state control parameter, which are stored in the memory, are input to a simulating module configured to perform a simulation, to set up an environment of the simulating module.

8. The method of claim 7, wherein the plurality of models comprise at least one artificial intelligence (AI) model, and
   the at least one AI model is trained using the simulating module.

9. The method of claim 8, wherein the at least one AI model comprises a reinforcement learning model, and
   the at least one AI model: obtains, as a state parameter, information related to a state of a virtual network from the simulating module, calculates, as an action parameter, a value of a virtual state control parameter, based on the obtained information, and obtains, as a reward parameter, the information related to the state of the virtual network adjusted based on the calculated value of the virtual state control parameter from the simulating module.

10. An electronic device configured to control a state control parameter for adjusting a state of a network of a base station, using any one of a plurality of models, the electronic device comprising:
    a communication unit comprising communication circuitry configured to transmit and/or receive data to and from the base station;
    a memory storing the data and the plurality of models; and
    processing circuitry electrically connected to the communication unit and the memory, wherein the processing circuitry is configured to control the electronic device to:
    obtain information related to the state of the network from the base station;
    perform simulation on each of the plurality of models based on the obtained information related to the state of the network;
    select any one model from among the plurality of models based on a result of the performed simulation;
    calculate a value of the state control parameter using the selected any one model;
    determine safety of the calculated value of the state control parameter based on history information previously stored in the memory, wherein the calculated value of the state control parameter is determined to be safe if, based on the history information, performance of the network according to a key performance indicator (KPI) of a mobile communication network operator were not degraded when a value being equal to the calculated value of the state control parameter was previously applied; and
    based on a result of determining that the calculated value of the state control parameter is safe, transmit the value of the state control parameter to the base station to update the state control parameter.

11. The electronic device of claim 10, wherein the processing circuitry is configured to:

determine whether the value that is the same as the calculated value of the state control parameter was previously applied based on the history information.

12. The electronic device of claim 10, wherein the plurality of models comprise at least one artificial intelligence (AI) model, and
the at least one AI model is trained based on the information related to the state of the network.

13. The electronic device of claim 10, wherein the plurality of models comprise at least one rule-based algorithm model.

14. A method, performed by an electronic device, of controlling a state control parameter for adjusting a state of a network of a base station, using any one of a plurality of models includes at least one artificial intelligence (AI) model comprising a reinforcement learning model, the method comprising:
obtaining information related to the state of the network from the base station;
obtaining information about a current value of the state control parameter from the base station;
inputting the information related to the state of the network and the information about the current value of the state control parameter to a simulating module configured to perform a simulation, to set up an environment of the simulating module;
training the at least one AI model using the simulating module, wherein the at least one AI model is configured to: obtain, as a state parameter, information related to a state of a virtual network from the simulating module, calculate, as an action parameter, a value of a virtual state control parameter, based on the obtained information, and obtain, as a reward parameter, the information related to the state of the virtual network adjusted based on the calculated value of the virtual state control parameter from the simulating module;
performing simulation on each of the plurality of models based on the obtained information related to the state of the network;
selecting any one model from among the plurality of models based on a result of the performed simulation; and
transmitting a value of the state control parameter, calculated using the selected any one model to the base station to update the state control parameter.

15. The method of claim 14, wherein the information related to the state of the network comprises at least one of a number of user equipments (UEs) connected to each cell included in the base station, a physical resource block (PRB) usage of each cell, an Internet protocol (IP) throughput of each cell, or a downlink (DL) data volume of each cell.

16. The method of claim 14, further comprising:
storing the information related to the state of the network and the information about the current value of the state control parameter in a memory.

17. The method of claim 14, wherein the plurality of models comprise at least one rule-based algorithm model.

* * * * *